United States Patent Office 3,573,218
Patented Mar. 30, 1971

3,573,218
LIQUID SCINTILLATION COUNTING
COMPOSITION AND PROCESS
Royal H. Benson, Texas City, Tex., assignor to
Monsanto Company, St. Louis, Mo.
No Drawing. Continuation-in-part of abandoned applications Ser. No. 607,218 and Ser. No. 607,219, both filed Jan. 4, 1967. This application Apr. 11, 1968, Ser. No. 720,451
Int. Cl. F21k 2/00; C09k 1/00; C07c 43/20
U.S. Cl. 252—301.2
16 Claims

ABSTRACT OF THE DISCLOSURE

Liquid scintillation counting compositions comprising an aromatic hydrocarbon solvent, a scintillation solute and an ethoxylated alkyl phenol having from 7 to 16 carbon atoms in the alkyl substituent and a ratio of carbon atoms in the alkyl substituent to the average number of ethoxy groups of from 0.83 to 1.67.

BACKGROUND OF THE INVENTION

This is a continuation-in-part of copending applications Ser. No. 607,218, filed Jan. 4, 1967 and Ser. No. 607,219, filed Jan. 4, 1967, now both abandoned.

The present invention relates to liquid scintillation counting. More particularly, the present invention relates to an improved composition and process for liquid scintillation counting.

In recent years, liquid scintillation counting has become a very popular method for the measurement of low energy beta emitters such as $C^{14}$, $S^{35}$, and $H^3$. Briefly, liquid scintillation counting is accomplished by combining a radioactive sample to be analyzed with a liquid scintillator so as to form a counting sample. The radiation from the sample excites the liquid scintillator causing the emission of scintillation light pulses which are proportional to the radioactivity of the sample. These light pulses are then "counted" by use of suitable equipment. The liquid scintillator or phosphor useful in liquid scintillation counting generally comprises a solvent portion and a solute portion. The solute portion will hereafter be referred to as scintillation solute and may be comprised of a primary solute as well as other components such as a secondary solute. The second solute usually is a waveband shifter used to achieve a more desirable wavelength of the scintillation light pulses. The primary solute is generally referred to as a fluor and it will so be referred to hereafter. The most widely used solvents for liquid scintillation counting are the alkyl benzenes such as toluene, xylene, ethylbenzene and the like. However, one of the major drawbacks for the use of the alkylbenzene solvents is that they do not permit the counting of aqueous samples in a homogeneous medium. As a result, other phosphors have been developed such as mixtures of ethanol and toluene which permit the counting of aqueous samples in homogeneous solution. More recently, a composition comprised of toluene and an emulsifier, reported in Anal. Chem. 37, 854, 1965, has been found to be effective for the counting of aqueous samples in the form of an emulsion. The particular emulsifier reported was an ethylene oxide-octyl phenol adduct.

Even though these prior art scintillators permit the counting of aqueous samples, they suffer the disadvantage that they do not permit the measurement of counting samples containing high percentages of water. This is due to the decrease in counting efficiency which occurs as the water concentration of the counting sample is increased and to the fact that only small percentages of water may be dissolved or suspended homogeneously. Furthermore, it has been found that the results obtained when using the octyl phenol-ethylene oxide adduct emulsifier are dependent on the manner of preparing the counting sample and that poor precision of measurement results even with the most careful preparation of the counting sample.

SUMMARY

It is an object of the present invention to provide an improved liquid scintillator for scintillation counting which will permit the measurement of counting samples having a relatively large percentage of water with greater precision and higher efficiency than before possible. Another object of the present invention is to provide a composition for liquid scintillation counting which is insensitive to the manner of preparation. It is a further object of the present invention to provide an improved method for scintillation counting whereby counting samples having a relatively high percentage of water may be counted. Additional objects will become apparent from the following description of the present invention.

The present invention in one of its embodiments is a composition for use in scintillation counting comprising an aromatic hydrocarbon solvent, a scintillation solute and an ethoxylated alkyl phenol wherein the alkyl substituent contains from 7 to 16 carbon atoms and the ratio of the number of carbon atoms in said alkyl substituent to the average number of ethoxy groups in said ethoxylated alkyl phenol is from 0.83 to 1.67. In another embodiment, the present invention relates to an improvement in a liquid scintillation counting process wherein a radioactive sample to be counted is combined with a liquid scintillator so as to form a counting sample and the resulting light emitted from said counting sample is measured so as to determine the radioactivity of said radioactive sample by using a liquid scintillator comprised of an aromatic hydrocarbon solvent, a scintillation solute, and an ethoxylated alkyl phenol wherein the alkyl substituent contains from 7 to 16 carbon atoms and the ratio of the number of carbon atoms in said alkyl substituent to the average number of ethoxy groups in said ethoxylated alkyl phenol is from 0.83 to 1.67.

DESCRIPTION OF THE PREFERRED EMBODIMENTS

The ethoxylated alkyl phenols useful in the present invention can be depicted structurally as follows:

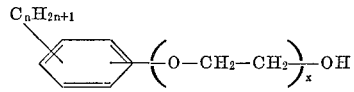

wherein $n$ is from 7 to 16 and $x$ represents the average number of ethylene oxide groups per molecule. The value of $x$ will, of course, vary depending on the number of carbon atoms in the alkyl substituent. In general, however the value of $x$ will be such that the value of $n/x$ will be from 0.83 to 1.67. Examples of suitable ethoxylated alkyl phenols and preferred ranges of $n/x$ include ethoxylated heptyl phenol having a range of from 0.83 to 1.08, ethoxylated octyl phenol having a range of from 0.83 to 1.11, ethoxylated nonyl phenol having a range of from 0.89 to 1.11, ethoxylated decyl phenol having a range of from 0.90 to 1.17, ethoxylated hendecyl phenol having a range of from 0.93 to 1.22, ethoxylated dodecyl phenol having a range of from 0.93 to 1.27, ethoxylated tridecyl phenol having a range of from 0.97 to 1.34, ethoxylated tetradecyl phenol having a range of from 1.08 to 1.55, ethoxylated pentadecyl phenol having a range of from 1.15 to 1.67 and ethoxylated hexadecyl phenol having a range of from 1.33 to 1.51. As above stated, $x$ represents an average number of ethoxy groups per molecule. Thus, for example, when speaking of an ethoxylated alkyl phenol having 10.0 ethoxy groups, there will be present molecules having both more and less than 10 epoxy groups.

The ethoxylated alkyl phenols useful in the present invention as well as methods for their preparation are well known. Usually, the ethoxylated alkyl phenols are prepared by condensing ethylene oxide with the desired alkylated phenol. It is generally preferred for the ethoxylated alkyl phenols of the present invention to be comprised mainly, that is, above 50% of the para form. However, it is especially preferred to use those where at least 80% of the ethoxylated alkyl phenol is in the para form with the remainder being substantially comprised of the ortho form.

The solvents generally found to be useful in preparing the compositions of the present invention are the liquid aromatic hydrocarbons. Non-limiting examples of the latter include benzene, toluene, o-, m-, p-xylenes and mixtures thereof, cumene, the ethylbenzenes and mesitylene. In particular, xylene, toluene and ethylbenzene have been found to give the highest counting efficiency. Especially preferred solvents are the xylenes, i.e., the ortho, meta or para isomers either alone or mixed. The volume ratio of solvent to the ethoxylated alkyl phenol useful in the composition of the present invention will generally be from 3:1 to 1:1. The ratio used will be determined by the sample stability requirements, the temperature at which the samples are measured, the counting efficiency requirements and the percentage of sample desired to be measured. The most useful ratios of solvent to ethoxylated alkyl phenol range from 2.4:1 to 1.6:1.

The scintillation solutes which may be used in the composition of the present invention are those which are well known in the art and the present invention is not to be construed as limited to the use of any particular scintillation solute. These scintillation solutes may be comprised of only a fluor or may also contain a secondary solute such as a spectrum shifter or wave-band shifter. The scintillation solute may also contain for some purposes a neutron-capture solute or a gamma-capture solute. Some of the more well-known fluors which are useful in the present invention are those selected from the group consisting of p-terphenyl, the oxazoles and the oxadiazoles. Probably, the best known oxadiazole fluor is PBD[2-(4-biphenylyl)-5-phenyl - 1,3,4 - oxadiazole] and the most well-known oxazole fluor is PPO[2,5-diphenyloxazole]. Some of the better known secondary solutes which may be combined with the foregoing primary solutes are POPOP[1,4-bis-2-(5 - phenyloxazolyl)-benzene], alpha-NOPON[p-bis-2-(5-1-naphthyloxazolyl)-benzene], DPH[1,6 - diphenyl - 1,3,5 - hexatriene], and alpha-NPO[2,(1-naphthyl) - 5 - phenyloxazole]. Another scintillation solute which has been mentioned in the prior art is m-terphenyl plus 0.5% anthracene. The scintillation solutes need only be present in amounts sufficient to enable the compositions of the present invention to be useful as liquid scintillators. The optimum amount will vary according to the particular component or components making up the scintillation solute and the amount will generally be a balance between cost, solubility, and performance requirements. The scintillation solute will generally be present in amounts of from 0.5 to 50 grams per liter but more often will be present in amounts from 1 to 12 grams per liter. It is especially preferred that the liquid scintillators of the present invention contain about 4 to 6 grams per liter of scintillation solute. When speaking of only primary solutes or fluors, these are generally present in amounts of about 0.5 to 12 grams per liter. Secondary solutes are generally present in relatively small amounts as compared to the fluors, that is, from about 0.05 to 3 grams per liter. The preferred scintillation solute of the present invention is comprised of PPO and POPOP.

In order to illustrate the present invention, the following examples are given. The figure of merit referred to in the examples is the product of the percent water in the counting sample and the percentage counting efficiency. This figure has been widely used as an indication of the suitability of liquid scintillators for counting aqueous samples and allows one to calculate the sensitivity which can be achieved with a given system. In general, the higher the value of the figure of merit the greater the sensitivity of the system.

EXAMPLE I

A liquid scintillator was prepared using toluene as solvent and an ethoxylated octyl phenol having a ratio of $n/x$ of 0.80. The volume ratio of toluene to phenol employed was 2:1. The scintillator contained as a scintillation solute 0.55% (wt./vol.) of PPO and 0.01% (wt./vol.) of POPOP. Using this liquid scintillator, counting samples containing greater than 25% by volume of tritium-labeled water could not be counted due to the formation of a two-phase system. Furthermore, the maximum figure of merit found for the counting sample containing 25% water was 480.

EXAMPLE II

A series of liquid scintillators made in accordance with the present invention and using various ethoxylated alkyl phenols was prepared using xylene as a solvent. A volume ratio of xylene to the ethoxylated alkyl phenol of 2 to 1 was employed in all cases. Each liquid scintillator prepared contained as the scintillation solute 0.55% (wt./vol.) of PPO and 0.01% (wt./vol.) of POPOP. To each liquid scintillator was added tritium-labeled water in an amount such that the resulting counting samples contained 30 volume percent water. The table below shows the counting efficiency and figure of merit obtained on the respective ethoxylated alkyl phenol employed.

TABLE

| Parent phenol | Average No. of ethoxy groups/ molecule | $n/x$ | Percent counting efficiency | Figure of merit |
|---|---|---|---|---|
| Octyl | 7.229 | 1.11 | 26.50 | 795 |
| Do | 9.629 | 0.83 | 23.43 | 703 |
| Nonyl | 8.090 | 1.11 | 18.73 | 562 |
| Do | 10.090 | 0.89 | 21.60 | 648 |
| Dodecyl | 9.460 | 1.27 | 27.17 | 815 |
| Do | 12.960 | 0.93 | 21.43 | 643 |
| Tetradecyl | 9.016 | 1.55 | 25.07 | 752 |
| Do | 13.016 | 1.08 | 20.50 | 615 |
| Pentadecyl | 9.0 | 1.67 | 24.90 | 747 |
| Do | 13.0 | 1.15 | 18.37 | 551 |

As can be seen by comparing the results of the table of Example II with the result of Example I, the liquid scintillators of the present invention are markedly superior, the figures of merit obtainable therewith being unexpectedly higher. The liquid scintillators of the present invention have been used to prepare counting samples containing up to 55% water by volume. Figures of merit comparable and higher to those seen in the above table have been obtained. The liquid scintillators of the present invention have been found to be particularly useful in preparing counting samples having from about 30 to about 50 volume percent water.

The present invention is not to be construed as being limited to the counting of radioactive samples which are themselves aqueous but may also be used to count samples of such radioactive materials as gases, proteins, acids, bases, salts, sugars and the like which may be dissolved or otherwise placed in aqueous form. For example, radioactive $CO_2$ may be counted in accordance with the present invention by first bubbling the gas through an aqueous solution of sodium hydroxide so as to form a solution of sodium carbonate which can then be counted. Likewise, proteins may be hydrolyzed in an aqueous alkali medium such as sodium hydroxide and the resulting aqueous sample of the hydrolyzed protein counted. Furthermore, the compositions of the present invention are not limited to the counting of aqueous samples but can be used with equal facility to count organic materials, both solids and liquids, which may or may not be soluble in water but which are soluble in the aromatic hydrocarbon solvent.

What is claimed is:

1. A composition for use in liquid scintillation counting comprising an aromatic hydrocarbon solvent, a scintillation solute and an ethoxylated alkyl phenol wherein the alkyl substituent contains from 7 to 16 carbon atoms and the ratio of the number of carbon atoms in said alkyl substituent to the average number of ethoxy groups in said ethoxylated alkyl phenol is from 0.83 to 1.67, the volume ratio of said solvent to said ethoxylated alkyl phenol being from 3:1 to 1:1, said solute being present in an amount of from 0.5 to 50 grams per liter of said composition.

2. The composition of claim 1 wherein the aromatic hydrocarbon solvent is xylene.

3. The composition of claim 2 wherein said scintillation solute is present in the amount of from 1 to 12 grams per liter and is comprised of a fluor and a wave-band shifter.

4. The composition of claim 3 wherein said scintillation solute comprises 2,5-diphenyloxazole and 1,4-bis-2-(5-phenyloxazolyl)-benzene.

5. The composition of claim 4 wherein the ethoxylated alkyl phenol is ethoxylated heptyl phenol and said ratio is from 0.83 to 1.08.

6. The composition of claim 4 wherein the ethoxylated alkyl phenol is ethoxylated octyl phenol and said ratio is from 0.83 to 1.11.

7. The composition of claim 4 wherein the ethoxylated alkyl phenol is ethoxylated nonyl phenol and said ratio is from 0.89 to 1.11.

8. The composition of claim 4 wherein the ethoxylated alkyl phenol is ethoxylated decyl phenol and said ratio is from 0.90 to 1.17.

9. The composition of claim 4 wherein the ethoxylated alkyl phenol is ethoxylated hendecyl phenol and said ratio is from 0.93 to 1.22.

10. The composition of claim 4 wherein the ethoxylated alkyl phenol is ethoxylated dodecyl phenol and said ratio is from 0.93 to 1.27.

11. The composition of claim 4 wherein the ethoxylated alkyl phenol is ethoxylated tridecyl phenol and said ratio is from 0.97 to 1.34.

12. The composition of claim 4 wherein the ethoxylated alkyl phenol is ethoxylated tetradecyl phenol and said ratio is from 1.08 to 1.55.

13. The composition of claim 4 wherein the ethoxylated alkyl phenol is ethoxylated pentadecyl phenol and said ratio is from 1.15 to 1.67.

14. The composition of claim 4 wherein the ethoxylated alkyl phenol is ethoxylated hexadecyl phenol and said ratio is from 1.33 to 1.51.

15. In a liquid scintillation counting process wherein a radioactive sample to be counted is combined with a liquid scintillator to form a counting sample and the resulting light emitted from said counting sample is measured to determine the radioactivity of said radioactive sample, the improvement which comprises using a liquid scintillator comprised of an aromatic hydrocarbon solvent, a scintillation solute, and an ethoxylated alkyl phenol wherein the alkyl substituent contains from 7 to 16 carbon atoms and the ratio of the number of carbon atoms in said alkyl substituent to the average number of ethoxy groups in said ethoxylated alkyl phenol is from 0.83 to 1.67, the volume ratio of said solvent to said ethoxylated alkyl phenol being from 3:1 to 1:1, said solute being present in an amount of from 0.5 to 50 grams per liter of said composition.

16. The process of claim 15 wherein the aromatic hydrocarbon solvent is xylene and the ratio of the amount of xylene to the amount of the ethoxylated alkyl phenol is from about 2.4:1 to about 1.6:1.

References Cited

UNITED STATES PATENTS 2,774,709  12/1956  Mayhew et al. _____ 167—42

OTHER REFERENCES

Patterson et al.: Anal Chem., 37 (1965), p. 854–7.

Kirk-Othmer: Encyclopedia of Chemical Technology, Interscience Encyclopedia Inc., New York, N.Y., vol. 13 (1954), p. 517.

TOBIAS E. LEVOW, Primary Examiner

A. P. DEMERS, Assistant Examiner

U.S. Cl. X.R.

260—613